No. 803,362. PATENTED OCT. 31, 1905.
R. H. RICE.
BUCKET WHEEL FOR ELASTIC FLUID TURBINES.
APPLICATION FILED MAY 10, 1904.

Witnesses.
Harry H. Tilden
Helen Orford

Inventor.
Richard H. Rice.
by Albert G. Davis
Atty.

UNITED STATES PATENT OFFICE.

RICHARD H. RICE, OF SWAMPSCOTT, MASSACHUSETTS, ASSIGNOR TO GENERAL ELECTRIC COMPANY, A CORPORATION OF NEW YORK.

BUCKET-WHEEL FOR ELASTIC-FLUID TURBINES.

No. 803,362.     Specification of Letters Patent.     Patented Oct. 31, 1905.

Application filed May 10, 1904. Serial No. 207,240.

*To all whom it may concern:*

Be it known that I, RICHARD H. RICE, a citizen of the United States, residing at Swampscott, county of Essex, State of Massachusetts, have invented certain new and useful Improvements in Bucket-Wheel Constructions for Elastic-Fluid Turbines, of which the following is a specification.

The present invention has for its object to improve and simplify the construction of bucket-wheels for elastic-fluid turbines, and more particularly that type of wheel having three or more rows of peripheral buckets.

Figure 1:
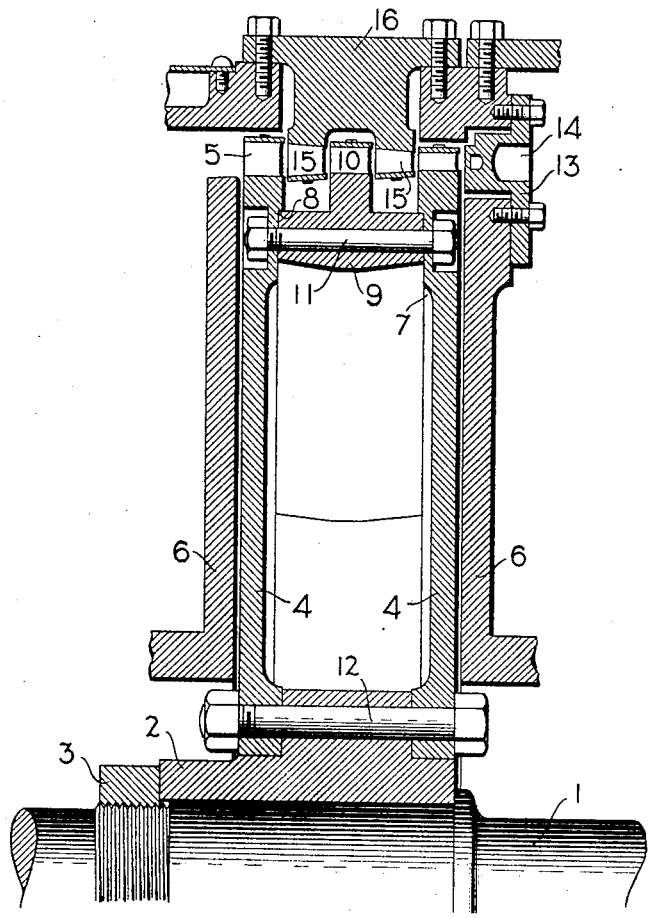
Figure 2:
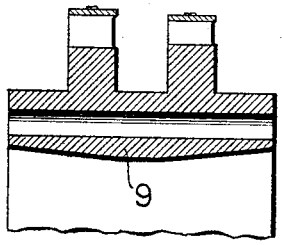

In the accompanying drawings, which illustrate one form of my invention, Figure 1 is a partial longitudinal section of a bucket-wheel, and Fig. 2 is a detail sectional view of a construction where four or more rows of wheel-buckets are employed.

1 represents the main shaft of the turbine, which is provided with a shoulder, with which the sleeve 2 abuts. The sleeve is retained in position by a collar and nut 3. The sleeve is provided with an external flange to which are bolted disks 4, each disk having a row of peripheral buckets 5 formed integral therewith or attached in a suitable manner. These buckets are provided with covers that are attached thereto by integral tenons or other suitable devices. The outer wall of one or both of the disks runs in close proximity to the walls 6 of the casing, the object of this arrangement being to reduce the windage or rotation losses as much as possible by cutting down the dead space between the wheel and the surrounding casing. The side faces of the disks and the walls of the casing are preferably made smooth to further reduce the rotation losses. The inner walls of the disks may be cut away, as at 7, to reduce the weight of the moving part. Near the periphery each disk is provided with a shoulder 8, and the shoulders of the two disks face each other. Located between the disks and engaging the shoulders is a cylindrical member 9, that is provided with one or more rows of peripheral buckets 10, which may be formed integral therewith in a rib or ribs or separate and attached by suitable means. The rib or ribs extend in the direction of the centrifugal strains and serve to strengthen the member at points intermediate its ends. The cylindrical member may be made in a single piece or of a number of sections properly united, as desired. The disks and cylindrical or intermediate member are secured by a plurality of axially-extending bolts 11. The bolts serve to hold the parts against movement in an axial direction, and the shoulders 8 take the major portion of the centrifugal strain. Extending through the sleeve 2, which forms a hub for the wheel, are axially-extending bolts 12. The heads and nuts on the bolts 11 are preferably countersunk to reduce the windage losses, while those of the bolts 12, being near the shaft, need not be so arranged.

The inclosing casing may be of any suitable construction; but it should closely surround the wheel if the best effects are to be obtained, and it is provided with as many openings as there are nozzles 13. In the present instance each nozzle is composed of a plurality of closely-associated sections, which may or may not expand, depending upon the conditions of service. Each nozzle-section is or may be provided with a well-rounded bowl 14, located anterior to the throat. Located between each two rows of wheel-buckets are intermediate buckets 15, which are adapted to receive steam or other motive fluid from one row of wheel-buckets and discharge it at the proper angle against the adjacent row of buckets. These buckets are provided with a support 16, which is bolted or otherwise secured to the outside of the casing. Preferably this support is made adjustable in an axial direction, so that the clearance between the relatively movable buckets can be adjusted. In the present illustration the bucket-spaces gradually enlarge from the end of the nozzle to the exhaust in order to accommodate the increased volume of fluid due to the decrease in pressure; but, if desired, I may make the bucket-spaces all of the same size, and with this arrangement the nozzle-passages may or may not expand to suit the requirements.

In Fig. 2 I have shown the cylindrical intermediate member 9 as being provided with two rows of peripheral buckets; but as many rows of buckets may be employed as is desired.

In accordance with the provisions of the patent statutes I have described the principle of operation of my invention, together with the apparatus which I consider to represent the best embodiment thereof; but I desire to have it understood that the apparatus shown is only illustrative and that the invention can be carried out by other means.

What I claim as new, and desire to secure by Letters Patent of the United States, is—

1. An elastic-fluid turbine comprising disks, in combination with a cylindrical member located wholly between and forming a separator for the disks, detachable devices for uniting the disks and cylindrical member, means located between the cylindrical member and the disks for transmitting the centrifugal strains from the said member to the disks, and a row of buckets carried by said member.

2. An elastic-fluid turbine comprising disks, in combination with a cylindrical member located between the disks, shoulders between the disks and said member for transmitting centrifugal strains from the latter to the former, and concentric rows of buckets carried by said member.

3. An elastic-fluid turbine comprising disks having buckets, in combination with a detachable cylindrical member located wholly between and supported by the disks, and a row of buckets carried by the said member.

4. An elastic-fluid turbine comprising disks and a shaft for rotating them, in combination with a detachable ring-like member, situated between and supported at its sides by the disks, one or more peripheral ribs on the member, buckets arranged on the rib or ribs and covers for the buckets.

5. An elastic-fluid turbine comprising disks, each provided with buckets, and a shaft for rotating the disks, in combination with shoulders formed on the disks which face each other, and a detachable cylindrical member which carries buckets and engages with the shoulders, and means for securing the parts.

6. An elastic-fluid turbine comprising rotating wheel-disks and a shaft therefor, in combination with opposing shoulders formed on the disks, a cylindrical member mounted between the disks and engaging with the shoulders, one or more rows of buckets carried by said member, and retaining-bolts which pass through the disks into the cylindrical member.

7. In an elastic-fluid turbine, the combination of a casing, bucket-carrying disks mounted within the casing and in close proximity to the walls thereof for decreasing the rotation losses, a cylindrical member mounted between the disks which cuts off the space between the disks from the chamber in the casing, one or more rows of buckets carried by the cylindrical member, and intermediate buckets situated between each two rows of wheel-buckets for receiving fluid from one row of buckets and discharging it at the proper angle against the adjacent row.

8. In an elastic-fluid turbine, the combination of disks, a means for spacing the disks apart at a point near the shaft, other means for separating the disks at a point near the periphery, and cutting off the space between them from motive fluid, and buckets some of which are carried by the disks and the remainder by said means.

In witness whereof I have hereunto set my hand this 7th day of May, 1904.

RICHARD H. RICE.

Witnesses:
DUGALD McK. McKILLOP,
JOHN A. McMANUS.